(12) United States Patent
Jiang et al.

(10) Patent No.: US 10,036,470 B2
(45) Date of Patent: Jul. 31, 2018

(54) CONTINUOUSLY VARIABLE TRANSMISSION (CVT) RATIO CONTROL

(71) Applicant: FORD GLOBAL TECHNOLOGIES, LLC, Dearborn, MI (US)

(72) Inventors: Hong Jiang, Birmingham, MI (US); Zhengyu Dai, Canton, MI (US); Weitian Chen, Windsor (CA); Timothy L. Sargent, Northville, MI (US); Yang Xu, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 243 days.

(21) Appl. No.: 14/939,421

(22) Filed: Nov. 12, 2015

(65) Prior Publication Data

US 2017/0138470 A1   May 18, 2017

(51) Int. Cl.
| | |
|---|---|
| B60W 10/101 | (2012.01) |
| F16H 61/662 | (2006.01) |
| F16H 59/18 | (2006.01) |
| F16H 59/44 | (2006.01) |
| F16H 59/54 | (2006.01) |
| F16H 59/36 | (2006.01) |
| F16H 59/22 | (2006.01) |

(52) U.S. Cl.
CPC .......... F16H 61/662 (2013.01); F16H 59/18 (2013.01); F16H 59/44 (2013.01); F16H 59/54 (2013.01); F16H 61/66259 (2013.01); *F16H 59/22* (2013.01); *F16H 2059/366* (2013.01)

(58) Field of Classification Search
CPC ................................................. B60W 10/101
See application file for complete search history.

(56) References Cited

U.S. PATENT DOCUMENTS

| | | | | |
|---|---|---|---|---|
| 4,836,054 A | * | 6/1989 | Kumura | ........... F16H 61/21 477/46 |
| 6,335,573 B1 | * | 1/2002 | Eguchi | ........... B60K 6/485 290/40 C |
| 6,371,883 B1 | * | 4/2002 | Eguchi | ........... B60K 6/365 477/107 |

(Continued)

FOREIGN PATENT DOCUMENTS

| | | | | |
|---|---|---|---|---|
| JP | 58170958 A | * | 10/1983 | ........... F16H 9/18 |
| WO | 2004059190 A1 | | 7/2004 | |

OTHER PUBLICATIONS

Machine translation of JP58170958 filed Mar. 13, 2018, pp. 9-20 (Year: 2018).*

*Primary Examiner* — Tisha D Lewis
(74) *Attorney, Agent, or Firm* — James Dottavio; Brooks Kushman P.C.

(57) ABSTRACT

A vehicle includes an engine with an associated engine-speed sensor, and wheels each having a respective wheel-speed sensor. The vehicle also includes a continuously variable transmission (CVT) coupled to the engine and configured to operate at variable input-to-output ratios. At least one controller is programmed to reduce the operating ratio of the CVT in response to the engine-speed sensor indicating the engine is operating at idle speed and the wheel-speed sensor indicating the velocity is approximately zero. This provides less noise, vibration and harshness in the vehicle due to the reduced ratio that is possible during conditions in which a vehicle launch in that reduced ratio may not be acceptable.

17 Claims, 2 Drawing Sheets

(56) References Cited

U.S. PATENT DOCUMENTS

| | | |
|---|---|---|
| 7,309,067 B2 | 12/2007 | Kita |
| 7,766,789 B2 | 8/2010 | Iwase et al. |
| 8,195,350 B2 | 6/2012 | Jinno |
| 2009/0298625 A1* | 12/2009 | Kodama ........... F16H 61/66259 474/11 |
| 2013/0337957 A1 | 12/2013 | Vranish |

* cited by examiner

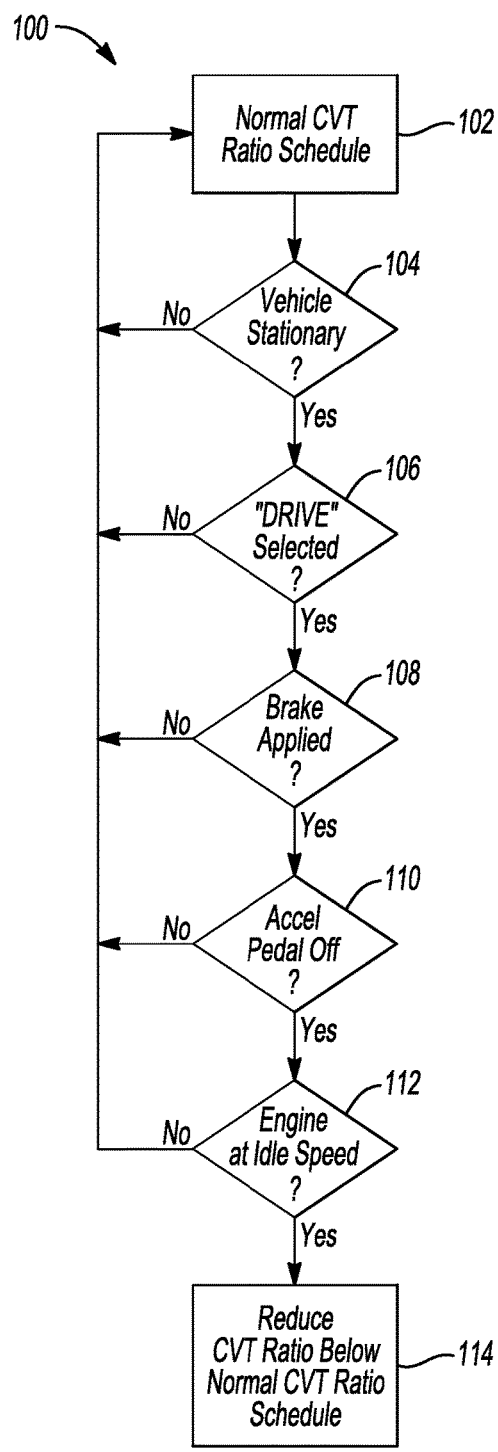
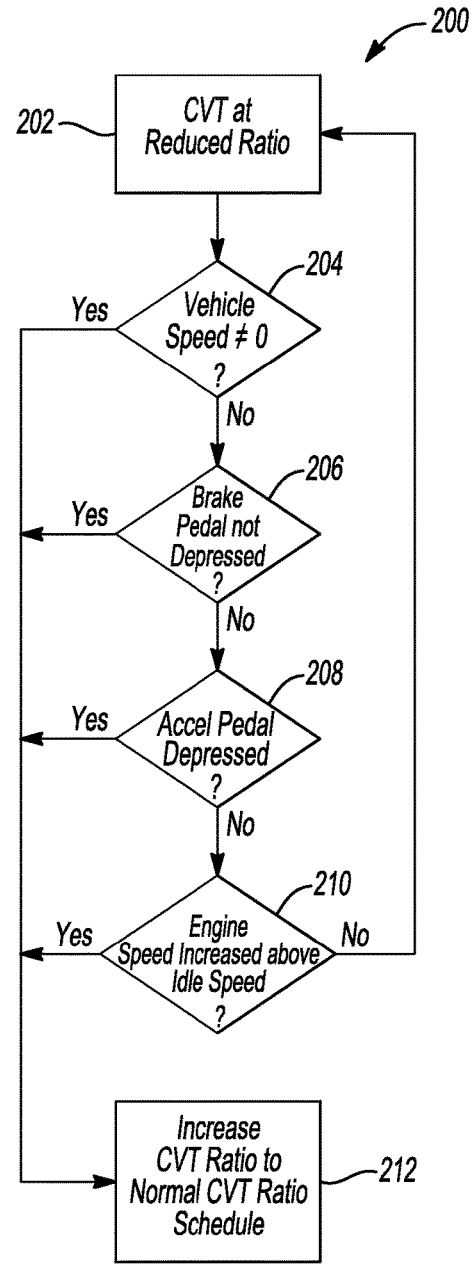
Fig-3
Fig-4

CONTINUOUSLY VARIABLE TRANSMISSION (CVT) RATIO CONTROL

TECHNICAL FIELD

The present disclosure relates to a vehicular control system for controlling the input to output ratio of a continuously variable transmission (CVT).

BACKGROUND

A continuously variable transmission (CVT) is an automatic transmission that can change seamlessly through an indefinite number of effective gear ratios between maximum and minimum values. This contrasts with other mechanical transmissions that offer a fixed number of gear ratios.

SUMMARY

According to one embodiment a vehicle includes an engine with an associated engine-speed sensor, and wheels each having a respective wheel-speed sensor. The vehicle also includes a continuously variable transmission (CVT) coupled to the engine and configured to operate at variable input-to-output ratios. At least one controller is programmed to reduce the operating ratio of the CVT in response to the engine-speed sensor indicating the engine is operating at idle speed and the wheel-speed sensor indicating the velocity is approximately zero.

The vehicle may also include a brake pedal and a brake-pedal sensor configured to detect brake application from an operator, wherein the controller is programmed to reduce the operating ratio of the CVT in response to the engine-speed sensor indicating the engine is operating at idle speed, the wheel-speed sensors indicating the velocity is approximately zero, and the brake-pedal sensor indicating the brake application exceeds a threshold.

The controller may be further programmed to increase the operating ratio of the CVT in response to the brake-pedal sensor indicating an absence of brake application from an operator.

The vehicle may also include a gear selector and a gear-selector sensor configured to detect the gear selector being in DRIVE, wherein the controller is programmed to reduce the operating ratio of the CVT in response to the engine-speed sensor indicating the engine is operating at idle speed, the wheel-speed sensors indicating the velocity is approximately zero, and the gear-selector sensor indicating the gear selector being in DRIVE.

The vehicle may also include an accelerator pedal and an accelerator-pedal sensor configured to detect a position of the accelerator pedal, wherein the controller is programmed to reduce the operating ratio of the CVT in response to the engine-speed sensor indicating the engine is operating at idle speed, the wheel-speed sensors indicating the velocity is approximately zero, and the accelerator-pedal sensor indicating the accelerator pedal is not depressed.

The controller may be further programmed to increase the operating ratio of the CVT in response to the engine-speed sensor indicating the speed of the engine has increased above the idle speed.

The controller may be further programmed to increase the operating ratio of the CVT in response to the wheel-speed sensors indicating the velocity has increased above approximately zero.

According to another embodiment, a vehicle includes an engine and a continuously variable transmission (CVT) coupled to the engine and configured to operate at variable input-to-output variator ratios. The vehicle includes at least one sensor configured to detect whether the vehicle is stationary. A controller is programmed to decrease the variator ratio in response to the sensors indicating the vehicle is stationary.

According to yet another embodment, a vehicle includes an engine and an engine-speed sensor configured to detect an engine speed. The vehicle also includes a CVT coupled to the engine, and a vehicle-speed sensor configured to detect a vehicle speed. A controller is programmed to decrease an input-to-output ratio of the CVT in response to the vehicle speed being zero and the engine speed decreasing from a non-idle speed to an idle speed.

BRIEF DESCRIPTION OF THE DRAWINGS

FIG. 3 is an exemplary algorithm implemented by at least one controller for reducing the operating ratio of the CVT, according to one embodiment; and FIG. 4 is an exemplary algorithm implemented by the at least one controller for increasing the operating ratio of the CVT back to its normally-scheduled ratio, according to one embodiment.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
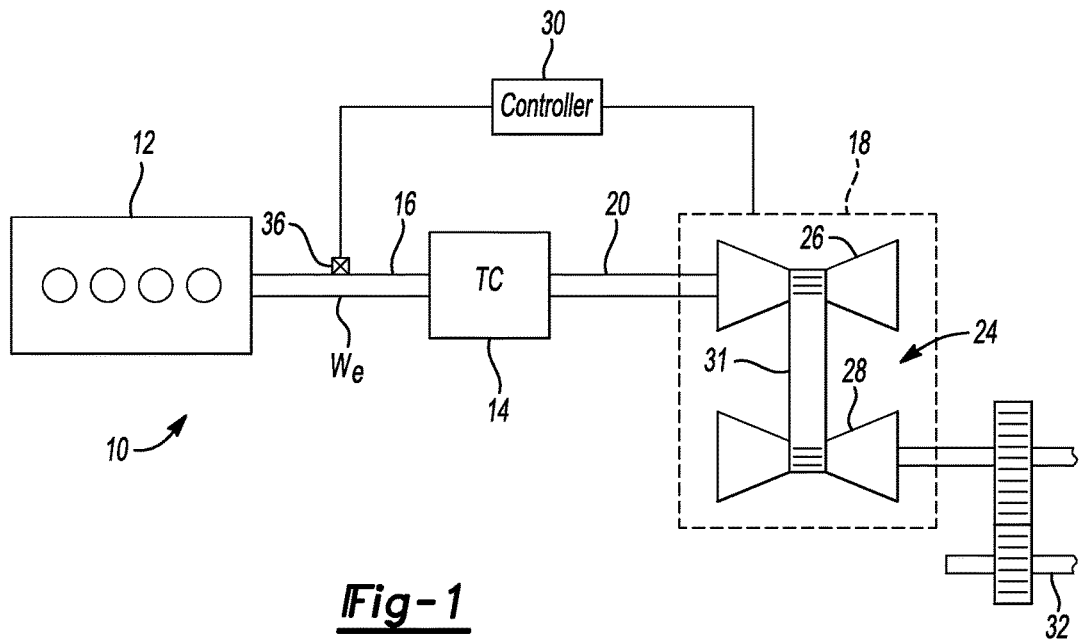
FIG. 1 is a schematic of a vehicle with a CVT, according to one embodiment.

FIG. 1 is a block diagram schematic illustrating a transmission control system in a vehicle 10. FIG. 1 shows one possible arrangement of a powertrain and transmission in the vehicle, but it should be understood that the illustration of FIG. 1 is merely exemplary. Other powertrain configurations exist and are known. For example, the vehicle may be a hybrid electric vehicle (HEV) or a battery electric vehicle (BEV) in which a separate motor/generator is provided in the powertrain. However, in all embodiments, a continuously variable transmission (CVT) is provided, which will be described in further detail below.

In the embodiment illustrated in FIG. 1, an internal combustion engine 12 is coupled to a torque converter 14 via a crankshaft 16. The torque converter 14 is, in turn, coupled to a transmission 18 via a turbine shaft 20, which can also be referred to as a transmission input shaft. The torque converter 14 has a bypass clutch (not shown) which can be engaged, disengaged, or partially engaged. When the bypass clutch is disengaged, torque flows through the torque converter 14 before traveling to the transmission 18. When the bypass clutch is engaged, torque bypasses the torque converter 14 and flows directly to the transmission 18. The transmission 18 may also be referred to as a variator.

The transmission 18 includes a CVT 24. The CVT can include a driving pulley or input pulley 26 and a driven pulley or an output pulley 28. A belt 31 or chain provides continuous movement from the input pulley 26 to the output pulley 28. The input pulley 26 has a first radius or input radius $R_i$ and the output pulley 28 has a second radius or output radius $R_o$. The first radius $R_i$ is controllably adjusted relative to the output radius $R_o$ via a controller 30. To adjust the radii, the controller 30 can provide signals to a hydraulic pressure source to move respective rotating plates of the input pulley 26 relative to the output pulley 28. This changes the path of movement and the winding radius of the belt 31, thereby altering the effective transmission ratio. Thus, a continuously variable transmission gear ratio can be provided from the shaft 20 to a drive axle 32.

While illustrated as one controller, the controller 30 may be part of a larger control system and may be controlled by various other controllers throughout the vehicle 10, such as a vehicle system controller (VSC). It should therefore be understood that the controller 30 and one or more other controllers can collectively be referred to as a "controller" that controls the CVT 24 in response to signals from various sensors that will be described below. The controller 30 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle. The controller 30 may include a computer that is specifically programmed to perform the exemplary actions detailed below, as opposed to a general purpose computer.

As will be described with reference to FIG. 2, both the input and the output pulleys 26, 28 are equipped with pulley speed sensors (not shown), which provide signals to the controller 30 for determining transmission ratio. Further, an engine-speed sensor 36 can be provided. The engine-speed sensor 36 is specifically configured to determine the rotating speed of the engine ($\omega_e$). The vehicle 10 also includes wheels (not shown) with associated wheel-speed sensors that are each configured to detect the rotational speed of its respective wheel. The wheel-speed sensors can collectively allow the controller to determine a speed of the vehicle, according to known methods. The controller 30 takes data from these sensors and other sensors (as will be described below) to command an effective operating ratio of the CVT 24.

Figure 2:
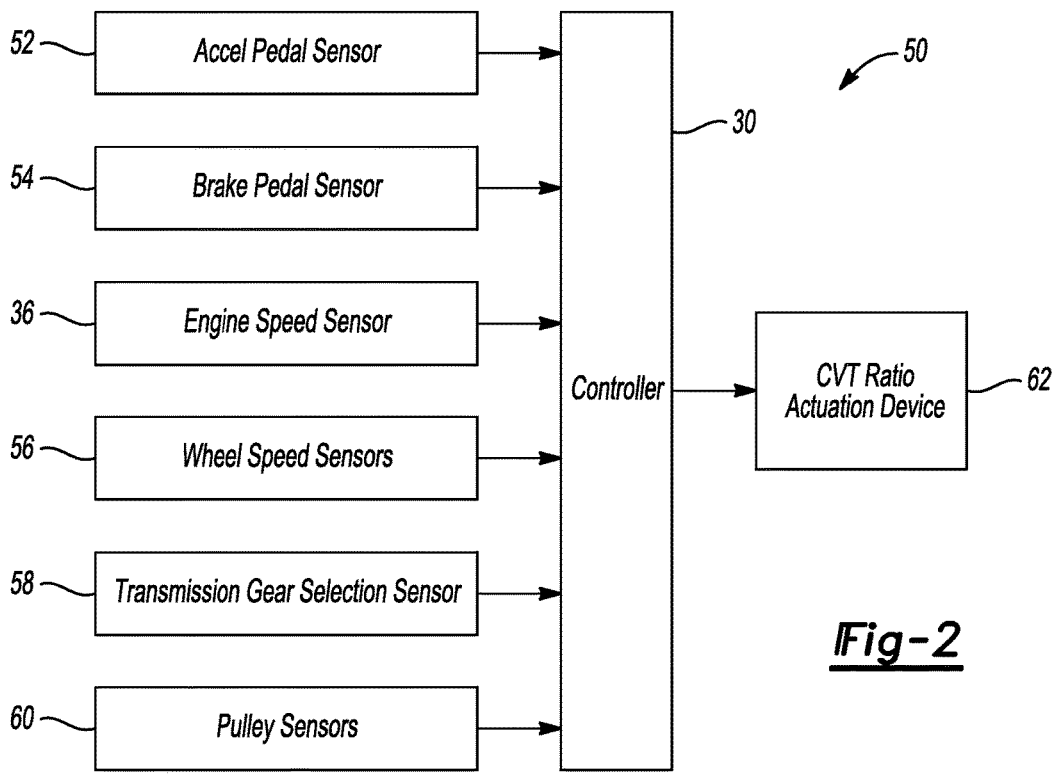
FIG. 2 is a schematic diagram of a control system for a CVT, according to one embodiment.

FIG. 2 is a schematic architecture diagram illustrating an embodiment of a networked control system 50 for controlling the CVT 24. The controller 30 receives signals from various sensors, places these signals in algorithms such as those embodied in FIGS. 3 and 4, and commands changes in the ratio of the CVT 24.

The control systems include sensors 52, 54, 36, 56, 58, and 60. An accelerator-pedal sensor 52 provides signals to the controller 30 that indicate the position of the accelerator pedal, or a magnitude of power or torque demanded by the driver. The sensor 52 can be a physical location sensor, a pressure sensor, or other known types of accelerator pedal sensors that indicate how much acceleration is demanded by the driver.

A brake-pedal sensor 54 provides signals to the controller 30 that indicate the position of the brake pedal, or a magnitude of brake power demanded by the driver. The sensor 54 can be a physical location sensor, a pressure sensor, or other known types of brake pedal sensors that indicate how much braking is demanding by the driver.

The engine-speed sensor 36 is also shown in FIG. 1, described above. The engine-speed sensor can be located along the crankshaft 16, for example, to detect the rotational speed of the crankshaft, and thereby the operating speed of the engine 12.

A wheel-speed sensor 56 provides signals to the controller 30 that indicate the speed of the wheels. Individual wheel-speed sensors 56 can be placed at each of the wheels of the vehicle to detect the speed of each individual wheel. One or more controller can compute a vehicle speed based on the speeds of some or all of the wheels. Therefore, the controller 30 can receive signals pertaining to the rotational speed of one wheel, multiple wheels or all wheels to determine a wheel speed or a vehicle speed, or can simply receive a signal from another control system regarding the speed of the vehicle.

The vehicle also includes a PRND gear selector allowing the driver to select an operation mode of the transmission—park, reverse, neutral, drive, overdrive, etc. A transmission gear-selection sensor 58 provides signals to the controller 30 indicating which of the operation modes the gear selector is in.

Pulley sensors 60 are also provided and are connected to the controller 30. The pulley sensors 60 can be mounted on or near the pulleys 26, 28 and are configured to detect the rotational speed of the pulleys. In one embodiment, the controller 30 can use the data from the pulley sensors 60 to confirm or control the ratio of input-to-output ratio of the CVT 24.

Using data from the various sensors, 52, 54, 36, 56, 58, and 60, the controller 30 controls a CVT ratio actuation device 62. As described above, the device 62 can be a hydraulic pressure source that is configured to adjust the operating ratio of the CVT 24.

Noise, vibration, and harshness (NVH) remains an important factor for drivability and overall comfort for a driver. Among many different driving conditions that could lead to vehicle NVH issues, one particular situation arises especially during city driving, in which the vehicle is stationary with the engine operating at an idle speed. According to various aspects of the present disclosure, NVH is improved during driving situations such as these by taking specific action in the CVT.

Unlike conventional transmissions, the gear ratio of the CVT 24 can be varied continuously within a range, and therefore can be used to actively enhance engine NVH performance, while also improving fuel economy and emissions. The gear ratio can be adjusted almost instantaneously, and much faster than conventional transmissions such as those containing planetary gearsets and clutches internal to the transmission. By adjusting the gear ratio of the CVT and managing the engine load in response to engine torque variation, the controller 30 can control the CVT 24 to isolate at least some of the engine torque disturbances and inhibit the disturbances from being transmitted to the vehicle drivetrain.

A control strategy is provided below for implementation by the controller 30 to change the operating ratio of the CVT 24 to reduce any possible NVH issues that may inherently arise from the engine. In response to various signals indicating the vehicle is stopped, in DRIVE, idling, and several optional additional parameters, the controller 30 commands the CVT 24 to reduce its operating ratio to a specific ratio below what would normally be commanded in these driving conditions. In one example, the CVT 24 is commanded to a ratio of approximately 60% of its maximum ratio of input to output speed. This transmits less torque excitation (compared with the torque excitation at the maximum ratio) to the output shaft of the transmission, the differential, and half shafts due to the lower transmission ratio.

FIG. 3 is a flow chart illustrating one example of an algorithm 100 implemented by the controller 30 to control the operation of the CVT 24. In this embodiment, the controller 30 reacts to various sensors to reduce the operating input-to-output ratio of the CVT 24.

At 102, the controller 30 is operating the CVT 24 at a "normal" operating ratio according to its specific shift schedule. This shift schedule can be pre-programmed into the control system of the vehicle, and the shift schedule can alter based on driving conditions. In one embodiment, the vehicle operates with a normal maximum input-to-output ratio when the vehicle is idling. This specific ratio is a capped maximum that will inhibit the CVT 24 from operating at any higher ratio while idling, as described above. Operating at this maximum ratio is considered a "normal" operation of the CVT 24. According to the exemplary algorithm shown in FIG. 3, the controller 30 can temporarily decrease the operating ratio below the normal maximum ratio during idling, given a specific set of circumstances determined to be true.

For example, at 104, the controller 30 determines whether the vehicle is stationary, or generally motionless. Such determination can be made by reading data from wheel speed sensors 56. If each of the wheel speed sensors output a "zero" as the wheel speed, it is determined the vehicle is stationary. Other methods for determining a generally motionless or stationary vehicle may be implemented according to the knowledge of a person of ordinary skill in the art.

At 106, output from the transmission gear selection sensor 58 is read by the controller. If the "DRIVE" gear is selected, the process continues to 108.

At 108, the controller 30 receives signals from the brake pedal sensor 54 indicative of the position of the brake pedal, or a magnitude of brake power demanded by the driver. In one embodiment, a brake on/off switch determines whether brakes are applied, regardless of the amount of brake desired. If the brake pedal is indeed applied, the process continues to 110.

At 110, the controller receives signals from the accelerator pedal sensor 52 to determine whether any acceleration is demanded from the driver. If no acceleration demand is provided, the process continues to 112.

At 112, the controller 30 receives signals from the engine speed sensor 36 and determines the operating speed of the engine. The controller 30 infers from the engine speed whether the engine is idling. In one embodiment, the controller is provided with a pre-programmed range of vehicle speeds that would indicate the engine is in fact idling. In one embodiment, the idling speed of the engine is between 600 rpm and 1,200 rpm, depending on the specific vehicle and operating conditions. The vehicle may be equipped with automatic engine on/off technology in which the engine automatically turns off when the vehicle is idling to conserve fuel. In those embodiments, the fact that the engine is turned off will not disrupt the process of FIG. 3, and it can be simply assumed that the engine is idling. In one or more embodiments, the engine idle speed can be changed by the operator of the vehicle.

The steps 104-112 are merely exemplary, and additional steps may also be provided. If each of the steps 104-112 yields a "yes," then at 114 the controller 30 reduces the CVT ratio below its normal maximum idling ratio. This reduction in input-to-output ratio can be temporary, as the controller will be programmed to continuously check signals in the algorithm 200 shown in FIG. 4.

Referring to FIG. 4, an exemplary algorithm 200 is shown that checks the operating conditions of the vehicle while the CVT is operated at its temporarily reduced ratio, shown at 202.

At steps 204, 206, 208, and 210, the controller 30 continues to check the data received from sensors that indicate the vehicle speed, the brake pedal depression, the accelerator pedal depression, and the engine speed. If any of the sensors indicate a change in activity from the algorithm of FIG. 3, the controller increases the CVT input-to-output operating ratio back to its normal ratio schedule, which may be the maximum allowable input-to-output ratio.

In particular, at 204 the controller 30 receives data indicative of the vehicle speed. At 206, the controller 30 receives the data indicating of brake pedal depression or brake demand from the operator. At 208, the controller 30 receives the data indicative of accelerator pedal depression. And, at 210, the controller receives the data indicating of engine speed. If any of the inquiries made during these steps yields a "yes," then the controller increases the CVT operating ratio back to its normally-scheduled ratio and removes the temporary reduction in ratio. For example, if the vehicle speed is no longer zero, or if the brake pedal is no longer depressed, or if the accelerator pedal becomes depressed, or if the engine speed increases above a speed that would indicate the engine is idling, then the controller 30 increases the CVT operating ratio to its normal ratio, which may be its maximum permissible input-to-output ratio.

While references above are made broadly to a "controller," it should be understood that this term should encompass processors or microprocessors that are configured to execute specific software-based commands to alter the operating ratio of the CVT 24. More than one controller as part of a control network can be provided and are intended to be covered by the term "controller."

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:
   an engine;
   an engine-speed sensor configured to detect a speed of the engine;
   wheels;
   a wheel-speed sensor configured to detect a velocity;
   a continuously variable transmission (CVT) coupled to the engine and configured to operate at variable input-to-output ratios; and
   a controller programmed to reduce the ratio in direct response to the engine-speed sensor indicating the engine is operating at idle speed and the wheel-speed sensor indicating the velocity is approximately zero.

2. The vehicle of claim 1, further comprising a brake pedal and a brake-pedal sensor configured to detect brake application from an operator, wherein the controller is programmed to reduce the operating ratio of the CVT in response to the engine-speed sensor indicating the engine is operating at idle speed, the wheel-speed sensors indicating the velocity is approximately zero, and the brake-pedal sensor indicating the brake application exceeds a threshold.

3. The vehicle of claim 2, wherein the controller is further programmed to increase the operating ratio of the CVT in response to the brake-pedal sensor indicating an absence of brake application from an operator.

4. The vehicle of claim 1, further comprising a gear selector and a gear-selector sensor configured to detect the gear selector being in DRIVE, wherein the controller is programmed to reduce the operating ratio of the CVT in response to the engine-speed sensor indicating the engine is operating at idle speed, the wheel-speed sensors indicating the velocity is approximately zero, and in direct response to the gear-selector sensor indicating the gear selector being in DRIVE.

5. The vehicle of claim 1, further comprising an accelerator pedal and an accelerator-pedal sensor configured to detect a position of the accelerator pedal, wherein the controller is programmed to reduce the operating ratio of the CVT in response to the engine-speed sensor indicating the engine is operating at idle speed, the wheel-speed sensors indicating the velocity is approximately zero, and the accelerator-pedal sensor indicating the accelerator pedal is not depressed.

6. The vehicle of claim 1, wherein the controller is further programmed to increase the operating ratio of the CVT in response to the engine-speed sensor indicating the speed of the engine has increased above the idle speed.

7. The vehicle of claim 1, wherein the controller is further programmed to increase the operating ratio of the CVT in response to the wheel-speed sensors indicating the velocity has increased above approximately zero.

8. A vehicle comprising:
   an engine;
   an engine-speed sensor configured to detect a speed of the engine
   a brake pedal with an associated brake-pedal sensor;
   a continuously variable transmission (CVT) coupled to the engine and configured to operate at variable input-to-output variator ratios;
   at least one sensor configured to detect whether the vehicle is stationary; and
   a controller programmed to decrease the variator ratio in response to the at least one sensor indicating the vehicle is stationary, increase the variator ratio in response to the brake-pedal sensor indicating a reduction of brake pedal application and the engine-speed sensor indicating the engine speed has increased from a first speed indicative of an idle speed to a second speed greater than the idle speed.

9. The vehicle of claim 8, further comprising the engine-speed sensor configured to detect a speed of the engine, wherein the controller is programmed to reduce the variator ratio of the CVT in response to the at least one sensor indicating the vehicle is stationary and the engine-speed sensor indicating the engine is operating at an idle speed.

10. The vehicle of claim 8, wherein the controller is further programmed to increase the variator ratio of the CVT in response to the at least one sensor indicating the vehicle has changed from being stationary to nonstationary.

11. A vehicle comprising:
    an engine;
    an engine-speed sensor configured to detect an engine speed;
    a CVT coupled to the engine;
    a vehicle-speed sensor configured to detect a vehicle speed; and
    a controller programmed to decrease an input-to-output ratio of the CVT in direct response to the vehicle speed being zero and the engine speed decreasing from a non-idle speed to an idle speed.

12. The vehicle of claim 11, further comprising a gear selector and a gear-selector sensor configured to detect the gear selector being in DRIVE, wherein the controller is further programmed to decrease the input-to-output ratio of the CVT in response to the gear selector being in DRIVE.

13. The vehicle of claim 11, further comprising a brake pedal and a brake-pedal sensor configured to detect brake application from an operator, wherein the controller is further programmed to decrease the input-to-output ratio of the CVT in response to the brake-pedal sensor indicating applied brake application from the operator beyond a threshold.

14. The vehicle of claim 13, wherein the controller is further programmed to increase the input-to-output ratio of the CVT in response to the brake-pedal sensor indicating the applied brake application from the operator is below the threshold.

15. The vehicle of claim 11, further comprising an accelerator pedal and an accelerator-pedal sensor configured to detect a position of the accelerator pedal, wherein the controller is further programmed to decrease the input-to-output ratio of the CVT in response to the accelerator-pedal sensor indicating the accelerator pedal is not depressed.

16. The vehicle of claim 15, wherein the controller is further programmed to increase the input-to-output ratio of the CVT in response to the accelerator-pedal sensor indicating the accelerator pedal is depressed beyond a threshold.

17. The vehicle of claim 16, wherein the threshold is zero.

* * * * *